(12) United States Patent
Zhang et al.

(10) Patent No.: US 9,750,000 B2
(45) Date of Patent: Aug. 29, 2017

(54) UPLINK DATA RECEIVING METHOD AND APPARATUS OF WIRELESS TRANSCEIVER DEVICE

(71) Applicant: Huawei Technologies Co., Ltd., Shenzhen (CN)

(72) Inventors: Lianbo Zhang, Shenzhen (CN); Yunbo Li, Shenzhen (CN); Jing Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 71 days.

(21) Appl. No.: 14/805,291

(22) Filed: Jul. 21, 2015

(65) Prior Publication Data

US 2015/0327257 A1 Nov. 12, 2015

Related U.S. Application Data

(63) Continuation of application No. PCT/CN2013/083934, filed on Sep. 22, 2013.

(30) Foreign Application Priority Data

Jan. 25, 2013 (CN) .......................... 2013 1 0028342

(51) Int. Cl.
*H04J 3/00* (2006.01)
*H04J 1/16* (2006.01)
(Continued)

(52) U.S. Cl.
CPC .... *H04W 72/0413* (2013.01); *H04B 7/15557* (2013.01); *H04J 11/004* (2013.01);
(Continued)

(58) Field of Classification Search
CPC .... H04B 1/126; H04B 1/7105; H04B 17/345; H04L 25/0212; H04W 16/14; H04W 52/243
See application file for complete search history.

(56) References Cited

U.S. PATENT DOCUMENTS

| 7,949,005 | B2* | 5/2011 | Li | H04W 72/12 370/437 |
| 2008/0064432 | A1* | 3/2008 | Park | H04B 1/126 455/522 |

(Continued)

FOREIGN PATENT DOCUMENTS

| CN | 1461161 A | 12/2003 |
| CN | 1956342 A | 5/2007 |

(Continued)

OTHER PUBLICATIONS

Wang et al., "Performance Comparison on Schemes for Suppressing Cross-Slot Interference in TD-SCDMA System," International Conference on Wireless Communications, Networking and Mobile Computing, pp. 1-4, Institute of Electrical and Electronics Engineers, New York, New York (Sep. 2009).

*Primary Examiner* — Melanie Jagannathan
(74) *Attorney, Agent, or Firm* — Leydig, Voit & Mayer, Ltd.

(57) ABSTRACT

The present invention provides an uplink data receiving method and apparatus of wireless transceiver device. The method includes: obtaining a wireless channel state parameter of neighboring wireless transceiver device of the device; obtaining downlink data sent by the neighboring wireless transceiver device in a cross slot with the device; reestablishing an interference signal according to the wireless channel state parameter and the downlink data; and removing the interference signal from an uplink data signal received by the device. By reestablishing the interference signal of the neighboring wireless transceiver device on an uplink data signal received by the device in the cross slot, and removing the interference signal from the uplink data signal received by the device, cross slot interference may be (Continued)

eliminated without influencing the flexible allocation of a dynamic TDD system on wireless resources.

12 Claims, 4 Drawing Sheets

(51) Int. Cl.
 *H04W 72/04* (2009.01)
 *H04L 5/00* (2006.01)
 *H04B 7/155* (2006.01)
 *H04W 72/08* (2009.01)
 *H04L 25/02* (2006.01)
 *H04J 11/00* (2006.01)

(52) U.S. Cl.
 CPC ........ *H04L 5/0053* (2013.01); *H04L 25/0204* (2013.01); *H04W 72/082* (2013.01)

(56) References Cited

U.S. PATENT DOCUMENTS

| | | | |
|---|---|---|---|
| 2009/0010228 A1* | 1/2009 | Wang | H04B 1/7105 370/335 |
| 2010/0189165 A1* | 7/2010 | Xu | H04B 1/7107 375/219 |
| 2010/0248736 A1* | 9/2010 | Hulkkonen | H04W 16/14 455/452.2 |
| 2011/0034192 A1* | 2/2011 | Lim | H04B 7/0417 455/501 |
| 2011/0201377 A1* | 8/2011 | Kazmi | H04W 52/244 455/522 |
| 2011/0223949 A1 | 9/2011 | Lee et al. | |
| 2011/0228711 A1* | 9/2011 | Du | H04W 56/00 370/280 |
| 2012/0134275 A1* | 5/2012 | Choi | H04L 5/0057 370/241 |
| 2012/0140683 A1 | 6/2012 | Xu et al. | |
| 2012/0257574 A1* | 10/2012 | Seok | H04W 72/046 370/328 |
| 2014/0226508 A1* | 8/2014 | Asplund | H04L 1/002 370/252 |

FOREIGN PATENT DOCUMENTS

| | | |
|---|---|---|
| CN | 101500198 A | 8/2009 |
| CN | 102035637 A | 4/2011 |
| EP | 2458803 A1 | 5/2012 |

* cited by examiner

UPLINK DATA RECEIVING METHOD AND APPARATUS OF WIRELESS TRANSCEIVER DEVICE

CROSS-REFERENCE TO RELATED APPLICATIONS

This application is a continuation of International Patent Application No. PCT/CN2013/083934, filed on Sep. 22, 2013, which claims priority to Chinese Patent Application No. 201310028342.X, filed on Jan. 25, 2013, both of which are hereby incorporated by reference in their entireties.

FIELD OF THE INVENTION

The present invention relates to wireless communication technology, and particularly, to an uplink data receiving method and apparatus of a wireless transceiver device.

BACKGROUND OF THE INVENTION

According to uplink and downlink service multiplexing manners, the third generation mobile communication systems may be divided into a time division duplex (Time Division Duplex, referred to as TDD) system, a frequency division duplex (Frequency Division Duplex, referred to as FDD) system and a hybrid division duplex (Hybrid Division Duplex, referred to as HDD) system, etc. The TDD system divides each wireless frame into wireless sub-frames, slots, symbols or the like with respect to time. The FDD system divides a wireless frame into wireless sub-frames, slots, symbols or the like with respect to frequency, and the HDD system may combine the division manners with respect to time and to frequency. No matter which duplex manner is adopted, the wireless frame is finally divided into multiple resource units as uplink and downlink wireless resources allocated to different users.

The names of the wireless transceiver devices in various wireless network cells are different, including for example a base station (Base Station, referred to as BS), an access point (Access Point, referred to as AP) or a node B (eNodeB) and the like, but the technologies of adopting the duplex technique to use the wireless resources are similar. In the TDD system, the wireless transceiver device receives uplink data and transmits downlink data in different slots of the same frequency channel (i.e., carrier), also called uplink slot and downlink slot. An uplink and downlink slot switch point (Switch Point) exists between the two kinds of slots of the same channel. A wireless frame which has fixed slot switch points is called a static TDD system. In order to adapt to the change of uplink traffic and downlink traffic, a dynamic TDD system is further provided in the prior art, namely, when the system operates, the uplink and downlink switch points in the wireless frame structure change within a smaller time scale, for example, less than 100 ms, so as to change the number ratio of the uplink slots and the downlink slots.

Although the dynamic TDD system may adapt to the flexible allocation of the wireless resources, it has an interference problem. The wireless frames of each wireless transceiver device in the wireless network are synchronous in the entire network, and when the uplink and downlink slot switch points of neighboring cells are not identical, cross slot interference will occur in the overlapped uplink and downlink slots of the neighboring cells. Interference exists between terminals, between the device and the terminal and between devices, and the cross slot interference between devices is particularly serious.

SUMMARY OF THE INVENTION

Embodiments of the present invention provide an uplink data receiving method of wireless transceiver device, for reducing cross slot interference.

A first aspect of the present invention provides an uplink data receiving method of wireless transceiver device, including:

obtaining a wireless channel state parameter of neighboring wireless transceiver device of the device;

obtaining downlink data sent by the neighboring wireless transceiver device in a cross slot with the device;

reestablishing an interference signal according to the wireless channel state parameter and the downlink data; and removing the interference signal from an uplink data signal received by the device.

In a first possible implementation manner of the first aspect, the obtaining a wireless channel state parameter of neighboring wireless transceiver device of the device includes:

measuring the wireless channel state parameter of the neighboring wireless transceiver device of the device in an uplink slot of a wireless frame of the device.

In combination with the first aspect or the first possible implementation manner of the first aspect, in a second possible implementation manner of the first aspect, the method further includes:

sending the wireless channel state parameter obtained by the device to the neighboring wireless transceiver device.

In the first possible implementation manner of the first aspect, the obtaining downlink data sent by the neighboring wireless transceiver device in a cross slot with the device includes:

receiving, via a central control node, forwarded or shared downlink data sent by the neighboring wireless transceiver device in the cross slot with the device; or receiving, via a backhaul, the downlink data sent by the neighboring wireless transceiver device in the cross slot with the device.

In the first possible implementation manner of the first aspect, the obtaining downlink data sent by the neighboring wireless transceiver device in a cross slot with the device includes:

obtaining frame structure configuration adopted by the neighboring wireless transceiver device;

determining the cross slot of the neighboring wireless transceiver device with the device according to the frame structure configuration; and extracting the downlink data in the cross slot from the obtained downlink data sent by the neighboring wireless transceiver device on a wireless frame.

A second aspect of the present invention provides an uplink data receiving apparatus of wireless transceiver device, including:

an information obtaining module, configured to obtain a wireless channel state parameter of neighboring wireless transceiver device of the device, and obtain downlink data sent by the neighboring wireless transceiver device in a cross slot with the device;

an interference reestablishing module, configured to reestablish an interference signal according to the wireless channel state parameter and the downlink data; and an interference removing module, configured to remove the interference signal from an uplink data signal received by the device.

In a first possible implementation manner of the second aspect, the information obtaining module is specifically configured to measure the wireless channel state parameter of the neighboring wireless transceiver device of the device in an uplink slot of a wireless frame of the device.

In combination with the second aspect or the first possible implementation manner of the second aspect, in a second possible implementation manner of the second aspect, the uplink data receiving apparatus of wireless transceiver device further includes:

a sending module, configured to send the wireless channel state parameter obtained by the device to the neighboring wireless transceiver device.

In the first possible implementation manner of the second aspect, the information obtaining module is specifically configured to receive, via a central control node, forwarded or shared downlink data sent by the neighboring wireless transceiver device in the cross slot with the device; or receive, via a backhaul, the downlink data sent by the neighboring wireless transceiver device in the cross slot with the device.

In the first possible implementation manner of the second aspect, the information obtaining module obtains the downlink data sent by the neighboring wireless transceiver device in the cross slot with the device in the following manner:

obtaining frame structure configuration adopted by the neighboring wireless transceiver device;

determining the cross slot of the neighboring wireless transceiver device with the device according to the frame structure configuration; and extracting the downlink data in the cross slot from the obtained downlink data sent by the neighboring wireless transceiver device on the wireless frame.

According to the uplink data receiving method of wireless transceiver device provided by the embodiments of the present invention, the wireless transceiver device reestablishes the interference signal of the neighboring wireless transceiver device to the uplink data signal received by the present device in the cross slot according to the obtained channel parameter of the neighboring wireless transceiver device and the downlink data sent by the neighboring wireless transceiver device in the cross slot, and removes the interference signal from the uplink data signal received by the present device. By adopting the method provided by the embodiment of the present invention, cross slot interference may be eliminated without influencing the flexible allocation of a TDD system on wireless resources.

BRIEF DESCRIPTION OF THE DRAWINGS

To illustrate technical solutions in the embodiments of the present invention or in the prior art more clearly, a brief introduction on the accompanying drawings which are needed in the description of the embodiments or the prior art is given below. Apparently, the accompanying drawings in the description below are merely some of the embodiments of the present invention, based on which other drawings may be obtained by those of ordinary skill in the art without any creative effort.

DETAILED DESCRIPTION OF THE EMBODIMENTS

In order that the purposes, technical solutions and advantages of the embodiments in the present invention are clearer, a further detailed description of the technical solutions in the embodiments of the present invention will be given below in combination with accompanying drawings. Apparently, the embodiments described below are merely a part, but not all, of the embodiments of the present invention. All of the other embodiments, obtained by those of ordinary skill in the art based on the embodiments of the present invention without any creative effort, fall into the protection scope of the present invention.

Figure 1:
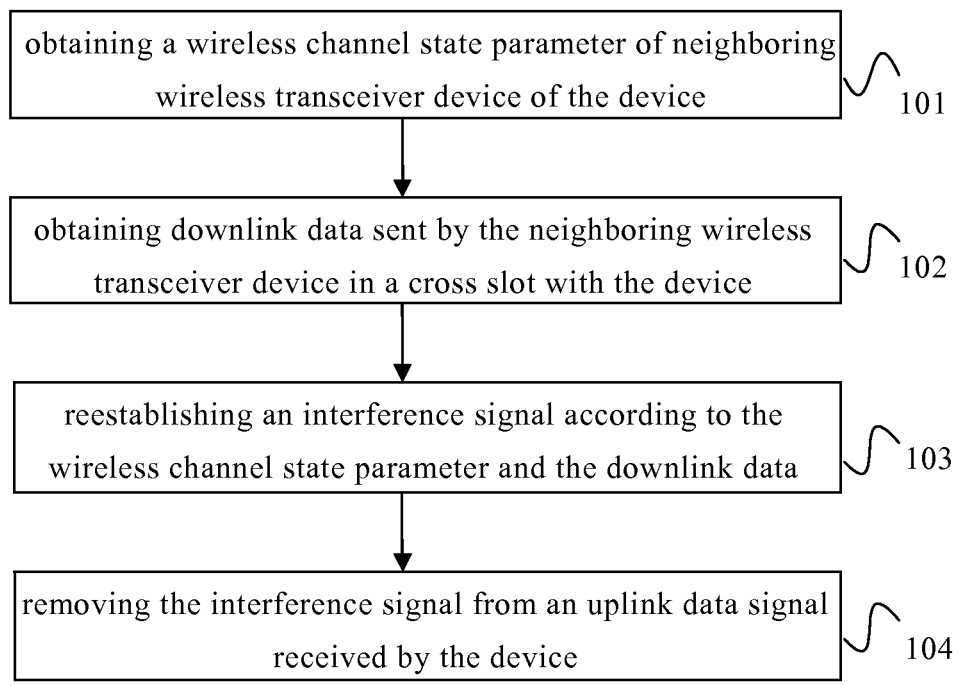
FIG. 1 is a flowchart of embodiment 1 of an uplink data receiving method of wireless transceiver device in the present invention.

FIG. 1 is a flowchart of embodiment 1 of an uplink data receiving method of wireless transceiver device in the present invention. The method may be applicable to any wireless transceiver device for receiving uplink data, which is implemented by an uplink data receiving apparatus, and the apparatus may be implemented in the form of hardware and/or software and is integrated in the wireless transceiver device. As shown in FIG. 1, the uplink data receiving method of the wireless transceiver device provided by the embodiment includes the following steps:

step 101: a wireless channel state parameter of neighboring wireless transceiver device of the device is obtained.

For example, the wireless transceiver device is a base station (BS), an AP or an eNodeB and the like, the wireless transceiver device obtains the wireless channel state parameter of the neighboring wireless transceiver device, and the wireless channel state parameter may be a channel matrix H, a channel quality indicator (CQI) (Channel Quality Indicator, referred to as CQI) and a rank (rank) of the channel matrix, etc. The channel matrix H is a common wireless channel state parameter in a multiple input multiple output (Multiple Input Multiple Output, referred to as MIMO) system, the channel matrix H is used for describing the characteristics of the channel by using a $n_R \times n_T$ plural matrixes H, $$H = \begin{bmatrix} h_{11} & h_{12} & \cdots & h_{1n_T} \\ h_{21} & h_{22} & \cdots & h_{2n_T} \\ \vdots & \vdots & \ddots & \vdots \\ h_{n_R 1} & h_{n_R 2} & \cdots & h_{n_R n_T} \end{bmatrix}$$

where the sub-element $h_{j,i}$ of the channel matrix H refers to the channel fading coefficient from the $j^{th}$ (j=1, 2 ... $n_T$) transmitting antenna to the $i^{th}$ (i=1, 2 ... $n_R$) receiving antenna.

Step 102: downlink data sent by the neighboring wireless transceiver device in a cross slot with the device are obtained.

In the step, after obtaining the wireless channel state parameter of the neighboring wireless transceiver device, the wireless transceiver device further obtains the downlink data sent by the neighboring wireless transceiver device in the cross slot with the device. The device may obtain the downlink data sent in the cross slot in the following methods.

In the first method, the device may receive, via a central control node, the forwarded or shared downlink data sent by the neighboring wireless transceiver device in the cross slot with the device. The central control node may be an access point controller (Access Point Controller, referred to as AC), or a base station manager (Base Station Manager, referred to as BSM). The AC is a connecting point between the AP and a gateway (gatway) and is used for sharing, aggregating and accessing the data from different access points (APs) to a network. The base station manager (BSM) is a connecting point between the base stations (BSs), one BSM usually controls several BSs, and its main function is to perform wireless channel management, implement call, establish and dismantle a communication link and control the handoff of moving stations (Moving Station, referred to as MS) in the control area, and the like. Therefore, the data among multiple APs or BSs may be shared via the AC or the BSM.

In the second method, the device receives, via a backhaul, the downlink data sent by the neighboring wireless transceiver device in the cross slot with the device. The backhaul (backhaul) is also called a signal tunnel and is used for achieving reliable signal transmission between network elements.

Only the downlink data in the cross slot may be obtained through the central control node or the backhaul, or all the downlink data of the wireless frame of the neighboring wireless transceiver device may be obtained, and then the downlink data in the cross slot are extracted therein.

Step 103. an interference signal is reestablished according to the wireless channel state parameter and the downlink data.

In the step, after obtaining the wireless channel state parameter of the neighboring wireless transceiver device and the downlink data sent in the cross slot, the device reestablishes the interference signal according to the wireless channel state parameter and the downlink data. The interference signal represents an interference signal of the downlink data signal sent by the neighboring wireless transceiver device in the cross slot to the uplink data signal received by the device in the cross slot.

Step 104. the interference signal is removed from the uplink data signal received by the device.

In the uplink data signal received by the device, due to the existence of cross slot interference, the uplink data signal both includes a useful signal received by the device and sent by a terminal and the interference signal generated by the neighboring wireless transceiver device. Therefore, the interference signal is removed from the uplink data signal according to the received uplink data signal and the interference signal of the neighboring wireless transceiver device to obtain the useful signal received by the device and sent by the terminal.

According to the uplink data receiving method of wireless transceiver device provided by the embodiment of the present invention, the wireless transceiver device reestablishes the interference signal of the neighboring wireless transceiver device to the uplink data signal received by the device in the cross slot according to the obtained wireless channel state parameter of the neighboring wireless transceiver device and the downlink data sent by the neighboring wireless transceiver device in the cross slot, and removes the interference signal from the uplink data signal received by the device. By adopting the method provided by the embodiment of the present invention, cross slot interference may be eliminated without influencing the flexible allocation of a TDD system on wireless resources.

In the embodiment, the concept of the neighboring wireless transceiver device needs to be clarified. For the device, the wireless transceiver device within a certain physical distance may be defined as the neighboring wireless transceiver device thereof. For example, with 5 km as a radius, when the distance between other wireless transceiver devices and the device is smaller than 5 km, all of the other wireless transceiver devices are the neighboring wireless transceiver devices of the device. Under this condition, since the neighboring wireless transceiver device is determined, the device may only obtain the wireless channel state parameter of the neighboring wireless transceiver device. Since the device may have multiple neighboring wireless transceiver devices, thus the wireless channel state parameters of multiple neighboring wireless transceiver devices are obtained in step 101, correspondingly, in step 102, the downlink data of multiple neighboring wireless transceiver devices also need to be obtained. By reestablishing multiple interference signals, the cross interference from multiple neighboring wireless transceiver devices may be eliminated.

However, the present invention is not limited hereto, the device may also determine the neighboring wireless transceiver device in other manners. For example, the device may preset all the wireless transceiver devices to be detected and the strength thresholds of corresponding pilot signals, after obtaining the pilot signal from the wireless transceiver device to be detected, the device judges whether the strength of the pilot signal is greater than a preset strength threshold of the pilot channel, if so, the device determines the wireless transceiver device as the neighboring wireless transceiver device of the device, namely, the downlink data sent by the wireless transceiver device in the cross slot will interfere the uplink data received by the device in the cross slot. After determining that the neighboring wireless transceiver device has cross interference, the device further obtains the channel parameter and the downlink data of the neighboring wireless transceiver device. The neighboring wireless transceiver device determined by the method is more accurate, but the resource of the wireless transceiver device will be increased.

Figure 2:
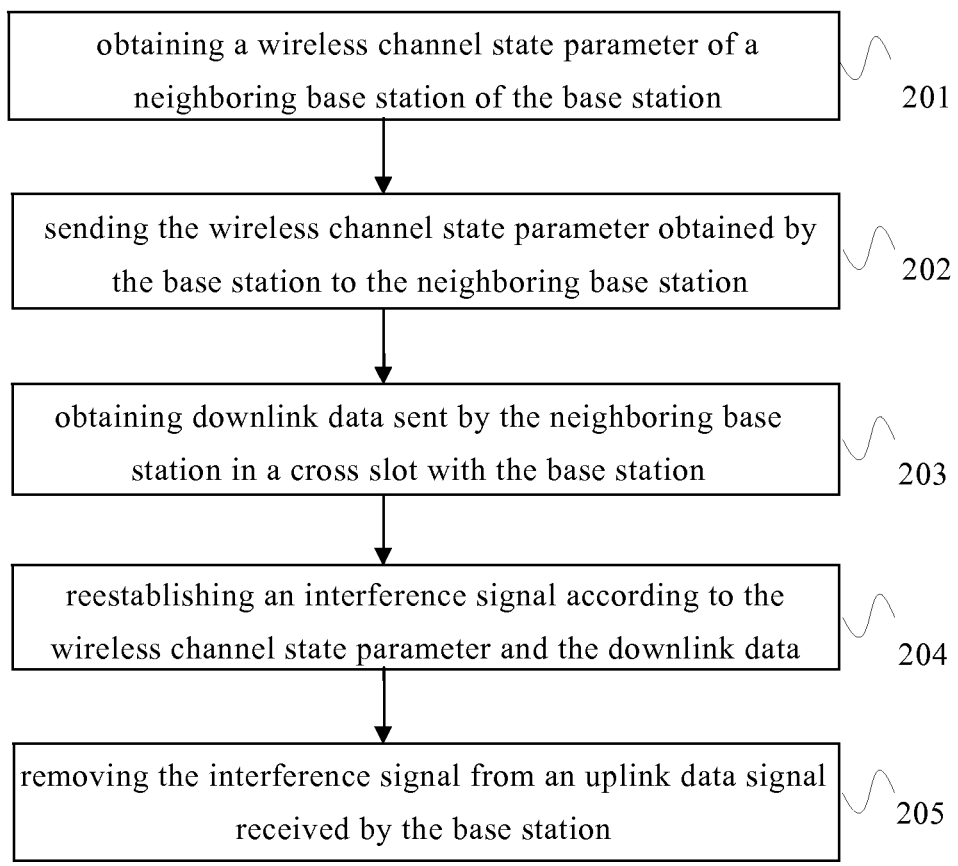
FIG. 2 is a flowchart of embodiment 2 of an uplink data receiving method of wireless transceiver device in the present invention.

FIG. 2 is a flowchart of embodiment 2 of an uplink data receiving method of wireless transceiver device in the present invention. Since the cross slot interference both includes interference between a terminal and a terminal and interference between a device and a device, and the cross slot interference between the device and the device is particularly serious. Thus, the embodiment mainly targets at the cross slot interference between the device and the device. A base station is taken as an example in the embodiment, since the emission power of the base station is large, the gain of the antenna is high and the dissipation between paths is small, compared with the cross interference between the terminal and the terminal, the interference between base stations is more serious. As shown in FIG. 2, the uplink data receiving method of the wireless transceiver device provided by the embodiment includes the following steps:

step 201. a wireless channel state parameter of a neighboring base station of the base station is obtained.

Figure 3:
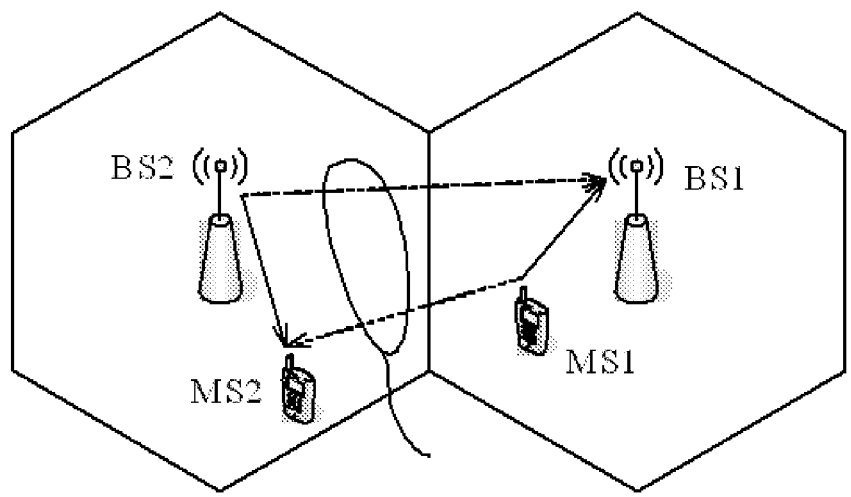
FIG. 3 is a schematic diagram of cross slot interference between two base stations applicable to an embodiment of the present invention.
Figure 4:
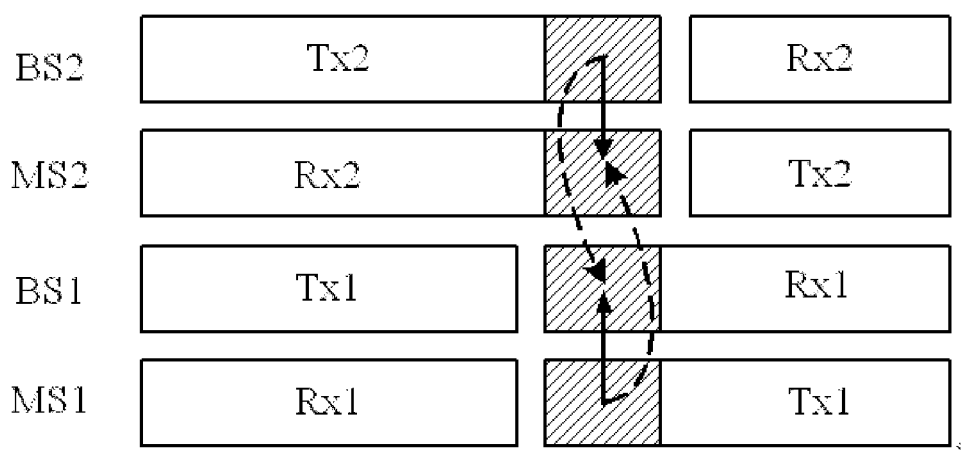
FIG. 4 is a schematic diagram of structures of wireless data frames sent and/or received by the base stations and moving stations in FIG. 3.

Before obtaining the wireless channel state parameter of the neighboring base station, the base station needs to determine the neighboring base station, and the method of determining the neighboring base station is mentioned above. FIG. 3 is a schematic diagram of cross slot interference between two base stations applicable to an embodiment of the present invention, as shown in FIG. 3, an uplink data signal received by a base station BS1 from a moving station MS1 will be interfered by a downlink data signal sent by a base station BS2 to a moving station MS2, thus BS2 is determined as the neighboring base station of the base station BS1. FIG. 4 is a schematic diagram of structures of wireless data frames sent and/or received by the base stations and moving stations in FIG. 3. As shown in FIG. 4, the slot in the frame structure configuration of the base station BS1 is divided into two parts, Tx1 slot is used for sending data, Rx1 slot is used for receiving data, and the corresponding moving station MS1 receives the data sent by the base station BS1 at the Rx1 moment and sends data to the base station BS1 at the Tx1 slot. When the base station BS1 receives the data sent by the moving station MS1, the neighboring base station BS2 sends data to the moving station MS2, since the frame structure configuration received by the BS1 is different from the frame structure configuration sent by the BS2, namely, the switch points are not aligned, cross slot interference will be generated, and the dash area in FIG. 4 represents the cross slot interference. In the figure, the solid line represents the transmission path of useful data, and the dotted line represents the transmission path of cross interference.

In the embodiment, all the base stations are supposed to have the capacity of measuring the wireless channel state parameter of the neighboring base station. The base station may obtain the wireless channel state parameter in the following method: measuring the wireless channel state parameter of the neighboring base station in the uplink slot of a wireless frame of the base station. Specifically, the base station may measure the wireless channel state parameter by means of its own blank uplink slot (or symbol or resource unit). Preferably, the base station may configure a periodic blank measurement slot (or symbol or resource unit), for measuring the wireless channel state parameter by means of the blank measurement slot. The measurement period may be set according to actual demand, for example, for the base stations, since the relative position of the base stations is very fixed, the parameter change of the channel between the base stations is not large, the measurement period may be set relatively longer, in this way, unnecessary resource waste may be reduced and the load capacity of the base stations is reduced.

In practical application, the base station may measure the wireless channel state parameter via the pilot signal sent by the neighboring base station. In the embodiment, the base station receives the pilot signal sent by the neighboring base station by using the blank measurement slot and estimate a channel matrix according to the channel of the pilot signal. After receiving the pilot signal of the neighboring base station, the base station needs to distinguish the pilot signals of multiple neighboring base stations (may be time division, frequency division, code division or multiple methods are collectively used) to estimate the channel matrix. In the embodiment, for example, the channel parameter of the neighboring base station BS2 obtained by the base station BS1 is a channel matrix H12.

Step 202. the wireless channel state parameter obtained by the base station is sent to the neighboring base station.

Figure 5:
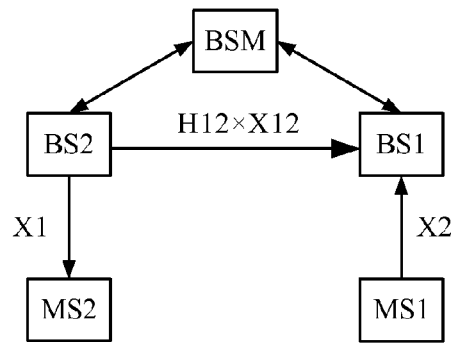
FIG. 5 is a flowchart of information interaction between two base stations applicable to an embodiment of the present invention.

Due to the reciprocity between the channels, in a dynamic TDD system, the roles of the cross slot will change dynamically between interfering and being interfered. Therefore, after a certain base station measures the wireless channel state parameter of the neighboring base station, the base station sends the obtained wireless channel state parameter to the neighboring base station. FIG. 5 is a flowchart of information interaction between two base stations applicable to an embodiment of the present invention, as shown in FIG. 5, the base station BS1 sends the obtained channel matrix H12 to BSM, the BSM sends the channel matrix H12 to the BS2, when managing multiple base stations, the BSM may send the channel matrix to all managed base stations by broadcasting. In this way, the neighboring base station may share the wireless channel state parameter information, before receiving uplink data, the neighboring base station may firstly detect whether having the wireless channel state parameter of the neighboring base station or not, if no wireless channel state parameter is detected, the base station needs to obtain the wireless channel state parameter. If the wireless channel state parameter exists and is effective, the neighboring base station directly calculates interference information according to the shared wireless channel state parameter information without measuring the wireless channel state parameter, thus the measurement and calculation costs may be reduced.

Step 203. downlink data sent by the neighboring base station in the cross slot with the base station are obtained.

In the embodiment, the base station may receive, via the BSM, the forwarded or shared downlink data sent by the neighboring base station in the cross slot with the base station; or receive, via the backhaul, the downlink data sent by the neighboring base station in the cross slot with the base station.

Specifically, the base station may obtain the downlink data sent by the neighboring base station in the cross slot with the base station in the following manner:

Step 1, the base station obtains the frame structure configuration adopted by the neighboring base station.

For all the base stations in the network, when sending downlink data, the frame structure configuration thereof is synchronized onto the BSM, for enabling all the base stations managed by the BSM to share the information. Before receiving uplink data, the base station may send a request message to the BSM after step 201 or 202, wherein the request message is used for obtaining the wireless frame structure configuration of the neighboring base station, and the BSM sends back a response message to the base station according to the received request message, wherein the response message carries the frame structure configuration of the neighboring base station. Or after receiving the frame structure configuration reported by a certain base station, the BSM may broadcast the frame structure configuration to each base station.

Step 2, the base station determines the cross slot of the neighboring base station and the base station according to the received frame structure configuration sent by the neighboring base station.

Specially, the base station compares the received frame structure configuration of the downlink data sent by the neighboring base station with the frame structure configuration of the uplink data received by the base station to determine the cross slot.

Step 3, the base station extracts the downlink data in the cross slot from the obtained downlink data sent by the neighboring base station in the wireless frame.

In the step, after determining the cross slot, the base station extracts the downlink data in the cross slot sent by the neighboring base station from the obtained downlink data of the neighboring base station according to the cross slot. For example, as shown in FIG. 5, the uplink data of the moving station MS1 received by the base station BS1 are X1, the channel matrix between the base station BS1 and the moving station MS1 is H1, the downlink data sent by the base station BS2 to the moving station MS2 are X2, and the channel matrix between the base station BS2 and the moving station MS2 is H2. The base station BS1 extracts the downlink data X12 in the cross slot from the received downlink data signal X1 sent by the base station BS2, and the downlink data X1 and X12 are baseband signals.

Step 204. an interference signal is reestablished according to the wireless channel state parameter and the downlink data.

In frequency domain, the input signal and the channel matrix are known, the input signal and the channel matrix are multiplied to obtain a signal received by a receiving end. In the embodiment, the channel matrix of the neighboring base station BS2 measured by BS1 is H21, and the downlink data sent by BS2 in the cross slot are X12, then the interference signal is H12*X12.

Step 205. the interference signal is removed from the uplink data signal received by the base station.

In the embodiment, the uplink signal received by BS1 is (H2*X2+H21*X21), and the interference signal H12*X12 is subtracted to obtain a useful signal H2*X2 with interference removed.

When the base station has multiple neighboring base stations, multiple interference signals are reestablished, and the multiple interference signals are respectively subtracted from the received uplink data signals to simultaneously eliminate the cross slot interference from the multiple neighboring base stations.

By adopting the uplink data receiving method of wireless transceiver device provided by the embodiment, the cross slot interference from multiple neighboring wireless transceiver device may be eliminated, and meanwhile, the measurement and calculation on the wireless channel state parameter of the neighboring wireless transceiver device base station are reduced by an information sharing method.

Figure 6:
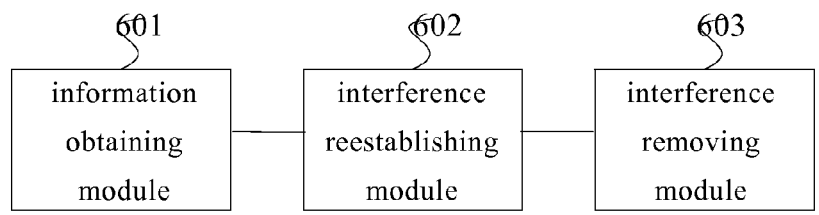
FIG. 6 is a schematic diagram of a structure of embodiment 1 of an uplink data receiving apparatus of wireless transceiver device in the present invention.

FIG. 6 is a schematic diagram of a structure of embodiment 1 of an uplink data receiving apparatus of wireless transceiver device in the present invention, as shown in FIG. 6, the uplink data receiving apparatus of wireless transceiver device provided by the embodiment includes: an information obtaining module 601, an interference reestablishing module 602 and an interference removing module 603.

The information obtaining module 601 is configured to obtain a wireless channel state parameter of neighboring wireless transceiver device of the device, and the information obtaining module 601 is further configured to obtain downlink data sent by the neighboring wireless transceiver device in a cross slot with the device.

The interference reestablishing module 602 is configured to reestablish an interference signal according to the wireless channel state parameter and the downlink data obtained by the information obtaining module 601.

The interference removing module 603 is configured to remove the interference signal reestablished by the interference reestablishing module 602 from an uplink data signal received by the device.

The uplink data receiving apparatus of wireless transceiver device provided by the embodiment is used for implementing the uplink data receiving method in embodiment 1.

According to the uplink data receiving apparatus of wireless transceiver device provided by the embodiment, by obtaining the wireless channel state parameter of the neighboring wireless transceiver device of the device and the downlink data sent by the neighboring wireless transceiver device in the cross slot with the device, reestablishing the interference signal, and removing the interference signal from the uplink data signal having interference and received by the device, the purpose of eliminating the cross slot interference is achieved.

Figure 7:
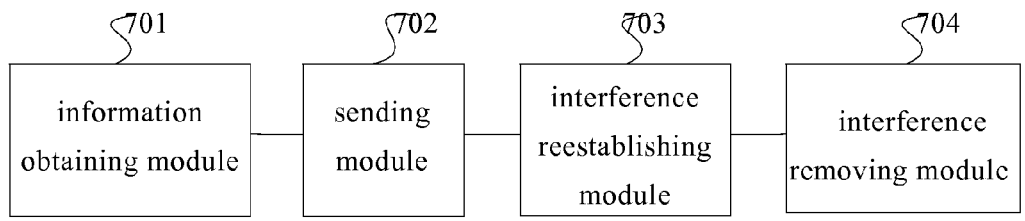
FIG. 7 is a schematic diagram of a structure of embodiment 2 of an uplink data receiving apparatus of wireless transceiver device in the present invention.

FIG. 7 is a schematic diagram of a structure of embodiment 2 of an uplink data receiving apparatus of wireless transceiver device in the present invention, as shown in FIG. 7, the uplink data receiving apparatus of wireless transceiver device provided by the embodiment includes: an information obtaining module 701, a sending module 702, an interference reestablishing module 703 and an interference removing module 704.

The information obtaining module 701 is configured to obtain a wireless channel state parameter of neighboring wireless transceiver device of the device, specifically, the information obtaining module 701 measures the wireless channel state parameter of the neighboring wireless transceiver device of the device in an uplink slot of a wireless frame of the device, the slot applied to measurement is a blank slot especially allocated to measure the channel parameter, and the slot resource necessary for sending user data could not be occupied. The information obtaining module 701 may periodically obtain the channel parameter of the neighboring wireless transceiver device, and the channel parameter may be a channel matrix H, a channel quality indicator (CQI) and a rank of the channel matrix, etc.

The information obtaining module 701 is further configured to obtain downlink data sent by the neighboring wireless transceiver device in a cross slot with the device after obtaining the wireless channel state parameter of the neighboring wireless transceiver device of the device. Specifically, the information obtaining module 701 may receive, via a central control node, the forwarded or shared downlink data sent by the neighboring wireless transceiver device in the cross slot with the device; or receive, via a backhaul, the downlink data sent by the neighboring wireless transceiver device in the cross slot with the device.

The information obtaining module 701 may also obtain the frame structure configuration adopted by the neighboring wireless transceiver device through the central control node or the backhaul, compare the obtained frame structure configuration of the downlink data sent by the neighboring device with the frame structure configuration of the uplink data received by the device to determine the cross slot of the neighboring wireless transceiver device with the device, and extract the downlink data in the cross slot from the obtained downlink data sent by the neighboring wireless transceiver device on a wireless frame.

The sending module 702 is configured to send the wireless channel state parameter obtained by the information obtaining module 701 to the neighboring wireless transceiver device. Due to the reciprocity of the channels, the wireless channel state parameter of the neighboring wireless transceiver device is the same, the wireless channel state parameter is sent to the neighboring wireless transceiver device by the sending module 702, in this way, the neighboring wireless transceiver device does not need to measure the wireless channel state parameter of the device, thus saving the measurement time and slot resources. Specifically, the sending module 702 sends the obtained wireless channel state parameter to the central control node, and the central control node sends the wireless channel state parameter to the neighboring wireless transceiver device.

The uplink data receiving apparatus of wireless transceiver device provided by the embodiment may be used for implementing the method provided in any embodiment of the present invention.

The uplink data receiving apparatus of wireless transceiver device provided by the embodiment may not only be used for eliminating cross interference, but also be used for reducing the measurement and calculation costs, since it may share the channel parameter of the neighboring wireless transceiver device.

Those of ordinary skill in the art may understand that all or a part of the steps for achieving the above-mentioned method embodiments may be implemented with a program instructing corresponding hardware. The foregoing program may be stored in a computer readable storage medium. When being executed, the program may execute the steps of the above-mentioned method embodiments; the foregoing storage medium includes a variety of media capable of storing program codes, such as an ROM, an RAM, a magnetic disk, an optical disk and the like.

Finally, it should be noted that the above-mentioned embodiments are merely used for illustrating the technical solutions of the present invention, rather than limiting them; although the present invention has been described in detail with reference to the foregoing embodiments, those of ordinary skill in the art should understand that they could still make modifications to the technical solutions recorded in the foregoing embodiments or make equivalent substitutions to a part of or all the technical features; and these modifications or substitutions do not make the essence of the corresponding technical solutions depart from the scope of the technical solutions of the embodiments of the present invention.

What is claimed is:

1. A method for a wireless transceiver device to receive uplink data, comprising:
    obtaining, by the wireless transceiver device, a wireless channel state parameter of a first neighboring wireless transceiver device, wherein the wireless channel state parameter is a channel matrix, a channel quality indicator or a rank of the channel matrix;
    obtaining, by the wireless transceiver device, downlink data sent by the first neighboring wireless transceiver device in a cross slot with the wireless transceiver device;
    reestablishing, by the wireless transceiver device, a first interference signal according to the wireless channel state parameter and the downlink data;
    removing, by the wireless transceiver device, the first interference signal from an uplink data signal received by the wireless transceiver device; and
    sending, by the wireless transceiver device, the obtained wireless channel state parameter to the first neighboring wireless transceiver device.

2. The method of claim 1, wherein obtaining the wireless channel state parameter comprises:
    measuring the wireless channel state parameter of the first neighboring wireless transceiver device in an uplink time slot of a wireless frame of the wireless transceiver device.

3. The method of claim 1, wherein obtaining the downlink data comprises:
    receiving, via a central control node, forwarded or shared downlink data sent by the first neighboring wireless transceiver device in the cross slot with the wireless transceiver device.

4. The method of claim 1, wherein obtaining the downlink data comprises:
    obtaining a frame structure configuration adopted by the first neighboring wireless transceiver device;
    determining the cross slot of the first neighboring wireless transceiver device with the wireless transceiver device according to the frame structure configuration; and
    extracting the downlink data in the cross slot from the obtained downlink data sent by the first neighboring wireless transceiver device on a wireless frame.

5. The method of claim 1, wherein obtaining the downlink data comprises:
    receiving, via a backhaul, the downlink data sent by the first neighboring wireless transceiver device in the cross slot with the wireless transceiver device.

6. A non-transitory, processor-readable medium having processor-executable instructions stored thereon for a wireless transceiver device to receive uplink data, the processor-executable instructions, when executed by a processor, facilitating performance of the following:
    obtaining, by the wireless transceiver device, a wireless channel state parameter of a first neighboring wireless transceiver device, wherein the wireless channel state parameter is a channel matrix, a channel quality indicator or a rank of the channel matrix;
    obtaining, by the wireless transceiver device, downlink data sent by the first neighboring wireless transceiver device in a cross slot with the wireless transceiver device;
    reestablishing, by the wireless transceiver device, a first interference signal according to the wireless channel state parameter and the downlink data;
    removing, by the wireless transceiver device, the first interference signal from an uplink data signal received by the wireless transceiver device; and
    sending the obtained wireless channel state parameter to the first neighboring wireless transceiver device.

7. The non-transitory processor-readable medium of claim 6, wherein obtaining the wireless channel state parameter comprises:
    measuring the wireless channel state parameter of the first neighboring wireless transceiver device in an uplink time slot of a wireless frame of the wireless transceiver device.

8. The non-transitory processor-readable medium of claim 6, wherein obtaining the downlink data comprises:
    receiving, via a central control node, forwarded or shared downlink data sent by the first neighboring wireless transceiver device in the cross slot with the wireless transceiver device.

9. The non-transitory processor-readable medium of claim 6, wherein obtaining the downlink data comprises:
    obtaining a frame structure configuration adopted by the first neighboring wireless transceiver device;
    determining the cross slot of the first neighboring wireless transceiver device with the wireless transceiver device according to the frame structure configuration; and
    extracting the downlink data in the cross slot from the obtained downlink data sent by the first neighboring wireless transceiver device on a wireless frame.

10. The non-transitory processor-readable medium of claim 6, wherein obtaining the downlink data comprises:
receiving, via a backhaul, the downlink data sent by the first neighboring wireless transceiver device in the cross slot with the wireless transceiver device.

11. The method of claim 1, further comprising: receiving a wireless channel state parameter of a second neighboring wireless transceiver device; and calculating a second interference signal according to the wireless channel state parameter of the second neighboring wireless transceiver device.

12. The non-transitory processor-readable medium of claim 6, wherein the processor-executable instructions, when executed, further facilitate:
receiving a wireless channel state parameter of a second neighboring wireless transceiver device; and
calculating a second interference signal according to the wireless channel state parameter of the second neighboring wireless transceiver device.

\* \* \* \* \*